United States Patent [19]

Sale et al.

[11] Patent Number: 4,684,110
[45] Date of Patent: Aug. 4, 1987

[54] LEAF SPRING CLAMP WITH ATTACHMENT MEANS

[75] Inventors: Robert F. Sale, Novi; Wayne E. Wells, Farmington Hills, both of Mich.

[73] Assignee: Ford Motor Company, Dearborn, Mich.

[21] Appl. No.: 803,753

[22] Filed: Dec. 2, 1985

[51] Int. Cl.⁴ .................. B60G 11/02; F16F 1/36
[52] U.S. Cl. ................................. 267/52; 267/148
[58] Field of Search ............... 267/37 R, 47, 52, 53, 267/54 A, 54 C, 148, 149; 403/226; 280/669, 699, 718

[56] References Cited

U.S. PATENT DOCUMENTS

| | | | |
|---|---|---|---|
| 206,778 | 8/1878 | English et al. | 267/52 |
| 952,139 | 3/1910 | Rice | 267/52 |
| 1,458,149 | 6/1923 | Reed | 267/52 |
| 1,512,198 | 10/1924 | Laher | 267/47 |
| 1,727,019 | 9/1929 | Shore | 267/53 |
| 1,970,765 | 8/1934 | Parkhill | 267/53 |
| 2,106,411 | 1/1936 | O'Donnell | 267/53 |
| 2,280,347 | 4/1942 | Olley et al. | 267/52 |
| 2,533,511 | 11/1945 | Rowland et al. | 267/47 |
| 2,571,475 | 1/1938 | O'Donnell | 267/52 |
| 2,600,843 | 4/1942 | Bush | 267/149 |
| 2,643,111 | 12/1950 | Burton | 267/52 |
| 2,654,597 | 10/1951 | Barenyi | 267/52 |
| 2,829,881 | 12/1951 | Morris | 267/149 |
| 3,061,301 | 10/1962 | Bajer et al. | 267/52 |
| 3,142,598 | 7/1964 | Rosen | 267/47 |
| 3,231,291 | 1/1966 | Kozicki et al. | 267/52 X |
| 3,250,546 | 5/1966 | Allison | 267/52 X |
| 3,377,060 | 4/1968 | Sherwood | 267/52 |
| 3,437,333 | 4/1969 | Koch et al. | 267/52 |
| 3,541,605 | 11/1970 | Mohl | 267/47 |
| 3,586,307 | 6/1971 | Brownyer | 267/47 |
| 3,602,523 | 8/1971 | Poulos | 267/52 X |
| 3,751,021 | 8/1973 | Foster | 267/52 |
| 3,968,958 | 7/1976 | Huchette et al. | 267/47 |
| 4,519,590 | 5/1985 | Wells | 267/52 |

FOREIGN PATENT DOCUMENTS

| | | | |
|---|---|---|---|
| 1406405 | 6/1965 | France | 267/52 |
| 54-141944 | 11/1979 | Japan | 267/149 |
| 0104207 | 3/1963 | Netherlands . | |

Primary Examiner—Andres Kashnikow
Assistant Examiner—Robert J. Oberleitner
Attorney, Agent, or Firm—Peter D. McDermott; Roger L. May

[57] ABSTRACT

An improved leaf spring clamp is provided, particularly for use with composite material leaf springs, to securely fix the position of the leaf spring relative to a wheel axle or other suspension system member, such as in the suspension system of a motor vehicle. The leaf spring clamp comprises a rigid clamp base, a resilient wedge insert, and a rigid clamp plate. The clamp base provides a bottom wall and substantially parallel side walls extending from the bottom wall to form a channel adapted to receive the wedge insert. The inner surface of at leaf one side wall of the clamp base fairs from both ends into a channel-widening concavity, preferably at the longitudinal midpoint of the channel. The wedge insert has a bottom wall and substantially parallel side walls extending from the bottom wall to a top wall and forms an inner channel adapted to laterally jacket the leaf spring. The outer surface of the wedge insert substantially fills the clamp base channel and, so, provides a convexity adapted to register with the channel-widening concavity of the clamp base. The clamp plate attaches to the clamp base to clamp the leaf spring between them under a pre-load. The clamp plate and clamp base together comprise tab-and-slot means such that they can accurately and easily be attached to each other in position to yield a preselected degree of pre-load.

15 Claims, 3 Drawing Figures

LEAF SPRING CLAMP WITH ATTACHMENT MEANS

RELATED APPLICATION

This application is related to commonly assigned U.S. patent application of W. E. Wells, Ser. No. 455,695 filed Jan. 5, 1983, now U.S. Pat. No. 4,519,590 and to commonly assigned U.S. patent application of D. G. Fesko, Ser. No. 689,364 filed Jan. 7, 1985, now U.S. Pat. No. 4,630,804.

TECHNICAL FIELD

This invention relates to a leaf spring clamp adapted to fix the position of a leaf spring in a suspension system, especially a filament reinforced composite material leaf spring on an axle, without damage to or dislocation of the reinforcing filaments or resin matrix of the leaf spring. The leaf spring clamp of the invention is especially suitable for use as an axle clamp in motor vehicle suspension systems.

BACKGROUND

Composite material leaf springs are known and typically comprise a filler material, for example glass roving or other filamentary solids, in an organic resin matrix such as thermoplastic or, more typically, thermosetting plastic. Such springs are shown, for example, in U.S. Pat. Nos. 2,600,843, 2,829,881 and 3,142,598. Known methods of making composite material leaf springs include, for example, filament winding, compression molding and pultrusion.

In the past, composite material leaf springs have been used in motor vehicle suspension systems with associated hardware to hold the spring accurately in position. Such spring clamping hardware has been fashioned after hardware previously known for use in conjunction with metal leaf springs. In a typical arrangement, the spring is positioned between a clamping plate on one side and the axle or other wheel carrying member on the other side. Often, a second clamping plate or the like is positioned between the spring and the axle to act as a spring seat. Bolts or the like, for example, U-bolts, are used to clamp the clamping plate and spring to the axle. An abrasion resistant pad can be used between the spring and the axle (or spring seat). Exemplary clamping hardware for a composite material leaf spring is seen, for example, in U.S. Pat. Nos. 3,968,958, 3,586,307 3,541,605.

Known leaf spring clamping hardware has been found inadequate in certain respects for use in conjunction with composite material leaf springs. Specifically, such spring clamping hardware has been found inadequate to hold the spring in a fixed position relative the axle under conditions experienced in ordinary use. More specifically, known spring clamping hardware often has failed to prevent longitudinal movement of the spring, that is, movement of the spring in a direction along its longitudinal axis (which typically is transverse to the longitudinal axis of the axle). Movement of the composite material leaf spring relative the axle or other wheel carrying member in a direction along the longitudinal axis of the leaf spring would change the pivot point of the leaf spring against the axle. Consequently, the spring rate would be altered and the spring would fail to perform according to design. Moreover, upon flexure of the spring, the compressive and tensile stresses would be improperly distributed, which could lead to increased material fatigue and decreased spring life. Moreover, if excessive, such movement could lead to damage to a vehicle powertrain.

While the longitudinal position of the spring could be adequately fixed by providing a hole through the composite material of the leaf spring and bolting the spring to the spring clamping hardware, this presents several disadvantages. Providing the bolt hole in the leaf spring requires additional fabrication time and introduces additional complexity and cost. In addition, the bolt hole significantly weakens the composite material spring and the spring, therefore, must be made larger, heavier and more costly.

A leaf spring clamp suitable for use with a composite material leaf spring is disclosed in above mentioned commonly assigned U.S. Pat. No. 4,519,590. Therein a leaf spring clamp is disclosed to comprise a rigid clamp base which forms a channel to jacket the leaf spring, and a resilient insert which is inserted between the leaf spring and the rigid clamp base. The resilient insert fills substantially entirely the space between the leaf spring and the rigid clamp base. It was found that displacement of the leaf spring within the clamp, especially large bending displacements of the spring, is impeded disadvantageously by the presence of such resilient insert. The resilient insert cannot be eliminated since the leaf spring must be effectively isolated from rigid clamp parts to prevent abrasion and crushing damage to the synthetic material of the spring. In above mentioned commonly assigned U.S. patent application Ser. No. 689,364, a leaf spring clamp is disclosed in which resilient inserts provide voids to accommodate bending displacement of a leaf spring within the clamp.

In the composite leaf spring clamp design disclosed in each of the abovementioned related cases, a degree of pre-load is exerted on the resilient inserts in the assembled clamp. The inserts are placed under a pre-load in part to assure better restraint of longitudinal movement of the spring. According to those designs, U-bolts are employed to hold metal clamp plates a pre-selected distance apart, with the resilient inserts (and leaf spring) sandwiched between them. The torque applied in tightening the U-bolt nuts determines the level of pre-load. This feature has been found to present certain difficulties in achieving consistent pre-loading of the clamps during initial assembly. Also, during re-assembly following repair or service, there is a possibility that the U-bolts could be improperly tightened, resulting in incorrect pre-loading of the clamp. In addition, there is the risk that U-bolt nuts might inadvertently loosen through use over time. It has been found that the degree of pre-load within the clamp effects the performance of the leaf spring. Thus, there is a need for a leaf spring clamp of the subject type in which the correct pre-load can be easily achieved with good repeatability and maintained during use over time.

It is an object of the present invention to provide a leaf spring clamp which secures a leaf spring, especially a filament reinforced composite material leaf spring, in position in a suspension system. More particularly, it is an object of the invention to provide a leaf spring clamp which in ordinary use substantially prevents longitudinal movement of the leaf spring. Furthermore, it is a particular object of the invention to provide a clamp which does not require either damage to or dislocation of either the reinforcing filaments or the resin matrix of the leaf spring and, specifically, which does not require a hole through the leaf spring or concavities in the surface of the leaf spring or other complexities in the shape of the leaf spring.

Additional objects and advantages of the invention will be apparent from the following disclosure.

DISCLOSURE OF THE INVENTION

According to the present invention, a leaf spring clamp adapted to secure a leaf spring, especially a composite material leaf spring, in position in a suspension system comprises a rigid clamp base comprising a bottom wall and two side walls, the side walls being substantially parallel to each other and each extending from the bottom wall to form therewith a longitudinal channel, wherein an inner surface of at least one of the side walls fairs from each longitudinal end into a channel-widening concavity. A resilient wedge insert, in one or more pieces, which is adapted to be positioned within and to register with the longitudinal channel formed by the clamp base, comprises a bottom wall adapted to lie adjacent to and in substantial contact with the inner surface of the clamp base bottom wall and two side walls being substantially parallel to each other and each extending upwardly from the bottom wall of the wedge insert to form therewith an inner longitudinal channel adapted to jacket the leaf spring laterally. The inner surface of each of the wedge insert side walls is adapted to contact the leaf spring along substantially the entire longitudinal dimension of the inner channel, and the outer surface of each side wall of the wedge insert is adapted to lie adjacent to an in substantial contact with the inner surface of the corresponding clamp base side wall. That is, the wedge insert side walls register with the channel-widening concavity, if any, of the corresponding, i.e. adjacent, clamp base side wall, so as to substantially fill such channel-widening concavity The wedge insert comprises another portion which, together with the bottom wall and side walls, substantially encircles the leaf spring laterally. The leaf spring clamp assembly further comprises a substantially rigid clamp plate adapted to be fixedly attached to the clamp base to clamp a leaf spring between them within the aforesaid inner channel.

According to a characterizing aspect of the invention, the aforesaid rigid clamp base provides longitudinal flanges extending outwardly from its aforesaid side walls, which flanges, in assembly, are adjacent to and coplaner with corresponding portions of the clamp plate. The corresponding portions of the clamp plate comprise outward extensions either in the plane of the clamp plate or offset therefrom. While the clamp base flange and clamp plate corresponding portions optionally provide bolt holes to receive U-bolt or the like for assembly, it is a characterizing aspect of the invention that on each side of the clamp the flange and corresponding portion are so positioned as to provide a desired, pre-selected pre-load when in assembly in contact with each other.

As a further feature of this characterizing aspect of the invention, the clamp base flanges and clamp plate corresponding portions provide tab and slot means for fixing the clamp plate flange and clamp base corresponding portions in contact with each other. More specifically, the clamp base flanges each provides one of a tab and a correspondingly positioned slot, and the clamp plate corresponding portions each provides the other of such tab and slot. In use, the tab is bent around into the slot approximately 180° into a U-shape to overlap and capture the other clamp component It will be readily apparent that the tab and slot means of the invention provides simple, repeatable control of clamp pre-load. The clamp plate and clamp base are pressed into contact and the tabs are bent over to fix them in contact with each other (or nearly in contact with each other). Since there is no need to measure the torque applied to U-bolt nuts or to measure the gap between the clamp plate and clamp base, the proper amount of pre-load is easily and consistently achieved. Thus, the intended, specified performance of the leaf spring held in the clamp is more consistently achieved and maintained during use over a period of time.

The leaf spring clamp of the present invention is seen to be particularly advantageous in view of its ability to fix or secure the position of a leaf spring, particularly a filament reinforced composite material leaf spring, without damaging either the reinforcing filaments or the resin matrix of the leaf spring. It is particularly advantageous that the clamp provides such position-fixing function without the necessity of being bolted to the leaf spring or otherwise positively attached to it. This advantage presents a significant advance in the art since it has been found that the presence of bolt holes in or through the leaf spring and like interruptions and dislocations in the filament reinforced synthetic material of a composite material leaf spring can significantly reduce the strength, structural integrity and durability of the leaf spring. Also, the additional fabrication time, complexity and cost required to provide such attachment means is avoided. Accordingly, leaf springs for use with the leaf spring clamp of the present invention can be designed smaller and of lighter weight for a given application. Reduced material costs and reduction in weight are highly significant advantages in applications such as motor vehicle suspensions, for which the present invention is especially well suited.

Other features and advantages of the invention will become more apparent from the following, detailed description thereof and from the drawings illustrating the preferred embodiments and best mode of carrying out this invention.

DESCRIPTION OF PREFERRED EMBODIMENTS

Referring now to the drawings, axle clamp 10 (also referred to as a leaf spring clamp) is seen to comprise an upper rigid member, clamp base 30, and a lower rigid member, clamp plate 40. A leaf spring 50 is sandwiched between the upper and lower rigid members. A wedge insert comprising resilient inserts 60 and 70 is positioned mediate the leaf spring and the upper and lower rigid members to cushion the leaf spring from the rigid clamp members during flexure of the leaf spring. These inserts can be symmetrical and can be identical, as in the preferred embodiment shown, to reduce the cost and complexity of manufacture, storage, assembly, etc. Clamp plate 40 is adapted to be secured, such as by welding or other known means, to a support member such as an axle member in a motor vehicle suspension system. The clamp base has a bottom wall 31 and parallel side walls 32A, 32B extending the bottom wall to form therewith a channel. The channel is adapted to receive resilient insert 60. Since composite material leaf springs typically are of substantially recttlinear cross-section, the side walls of the clamp base typically will be substantially perpendicular to the bottom wall and, correspondingly, the side walls of the wedge insert will be substantially perpendicular to the bottom wall of the wedge insert. The inner surface of the side walls of the clamp base each provides at least one channel-widening concavity 34A, 34B (seen as convexities as viewed in FIG. 1). That is, the channel-side surface of the side wall fairs into a lateral concavity such that the channel formed by the bottom wall and side walls of the clamp base becomes laterally wider than at the longitudinal ends of the clamp base (i.e., at the ends of the channel). The clamp base preferably further provides bolt holes 35A, 35B, 35C, and 35D (35C and 35D not shown) to facilitate assembly of the leaf spring clamp. Suitable means such as, for example, U-bolts or the like passing through such bolt holes can be used according to certain embodiments to secure the leaf spring clamp to the carrying axle or other support member of the suspension system in a conventional manner.

Figure 1:
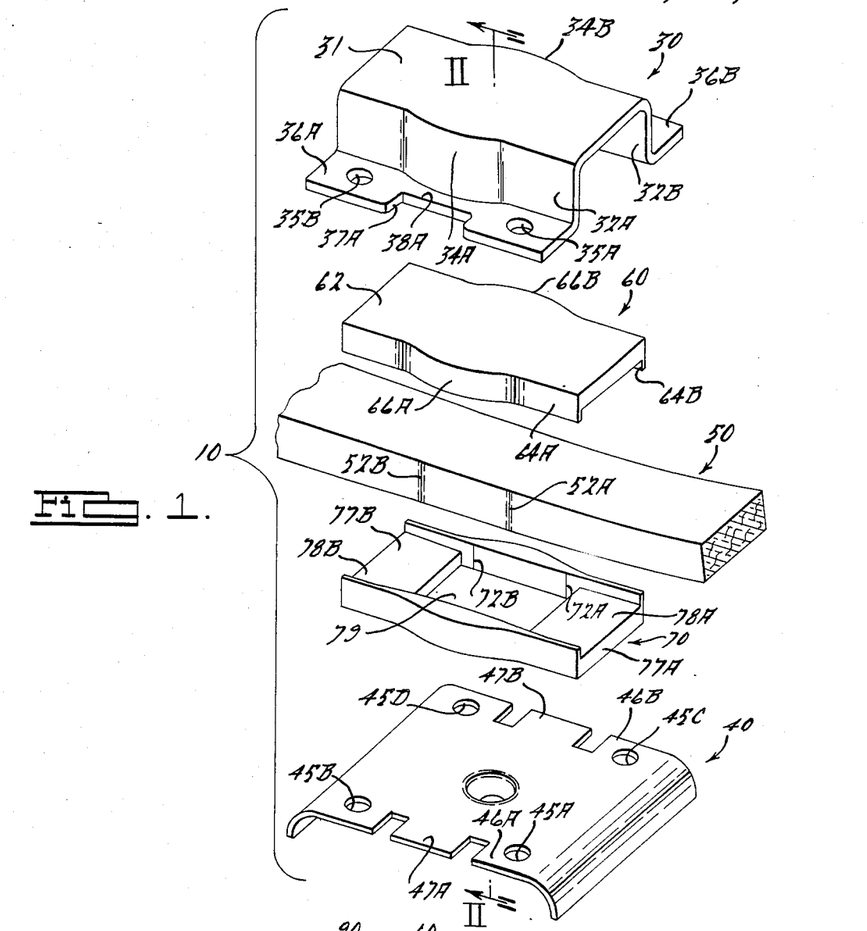
FIG. 1 is an exploded view, in perspective, of a leaf spring clamp assembly according to a preferred embodiment of the present invention.

The resilient insert 60 has a bottom wall 62 and substantially parallel side walls 64A, 64B extending from the bottom wall to form therewith an inner channel adapted to jacket a leaf spring. As noted above, such inner channel typically will be rectilinear since composite material leaf springs are typically of substantially rectilinear cross-section. The configuration of the outer surface of the resilient insert is such as to register with, i.e. to lie adjacent to and in substantial contact with the inner surface of the clamp base. That is, the wedge insert (comprising, in the embodiment shown, two halves, specifically, identical resilient inserts 60 and 70) should fit tightly within the channel formed by the clamp base. Thus, the outer surface of each side wall of resilient insert 60 provides a convexity 66A, 66B adapted to engage and substantially fill the corresponding channel-widening concavity of the side walls of the clamp base That is, each side wall of the wedge insert provides a convex portion or region which follows and is adapted to register with the channel-widening concave region of the adjacent side wall of the clamp base. Of course, the clamp base side walls each can provide multiple position-fixing concavities and the wedge insert then preferably would provide corresponding convexities for each of those multiple concavities. The second resilient insert, that is, lower resilient insert 70, as aforesaid, is substantially identical to resilient insert 60. It provides the same features discussed above in describing resilient insert 60 and functions in the same manner.

While not wishing to be bound by theory, it presently is understood that the channel-widening concavity of the clamp base functions together with the convexity provided by the outer surface of the wedge insert side walls to prevent movement of the leaf spring relative to the leaf spring clamp and, thus, relative to the suspension member to which the leaf spring clamp is attached. More particularly, such convexity/concavity feature is seen to prevent longitudinal movement of the leaf spring, that is, movement in a direction along the longitudinal axis of the leaf spring. Movement of the leaf spring would cause corresponding movement of the tight-fitting pre-loaded wedge insert which jackets it. Any such movement of the wedge insert, however, would cause the convex portion of the side walls to be shifted out of the corresponding concavity in the side wall of the clamp base, whereupon the wedge insert would be compressed in upon the jacketed leaf spring. Thus, a wedge effect is provided, whereby longitudinal movement of the spring causes the wedge insert to more tightly grip the sides of the spring and to more strongly resist such longitudinal movement. It will be apparent in view of the foregoing that the entire height of the wedge insert side walls can extend from one of the resilient inserts, rather than be divided such that side walls extend from both the upper and lower resilient inserts, as in the preferred embodiment shown in FIGS. 1 and 2.

Preferably the two side walls of the clamp base provide symmetrical and centrally disposed channel-widening concavities, as shown in FIG. 1. Preferably the depth of the concavity in the side wall of the clamp base is uniform in a direction normal to the bottom wall of the clamp base (or, where the side walls are not perpendicular to the bottom walls, uniform for the height of the side wall). Leaf spring clamps according to such preferred embodiments have been found to function exceptionally well to fix the position of synthetic material leaf springs in the suspension system of a motor vehicle.

As noted above, the wedge insert is adapted to receive and jacket a leaf spring, typically at about the longitudinal midpoint of the leaf spring. That is, the inner surface of the wedge insert which forms the inner channel is contoured to contact the corresponding surface of the leaf spring. Typically, a composite material leaf spring will provide an axle attachment region, a central portion of substantially constant width (i.e., substantially constant lateral dimension). Such leaf spring is generally not, however, of constant-width along its entire length but, rather, becomes wider toward each eye of the leaf spring. According to a preferred embodiment of the present invention, the leaf spring clamp extends longitudinally over a sufficient portion of the leaf spring to jacket not only the constant-width axle attachment region of the leaf spring but also a length of the wider portion of the leaf spring on either side thereof. The wedge insert is fashioned such that the contour of its inner channel corresponds to the contour of the leaf spring and, thus, the inner channel has an hour-glass shape in plan view, becoming somewhat wider (i.e., having increased lateral dimension) toward the longitudinal ends of the inner channel. In leaf spring 50 (the ends of which are broken away) lines 52A and 52B indicate the boundary between the central constant-width portions of the leaf spring and the widening portion on either side thereof. Correspondingly, lines 72A and 72B shown in the inner channel formed by the lower resilient insert 70 are the boundary between the central portion of the inner channel adapted to jacket the central constant-width portion of the leaf spring and the portions of the inner channel on either side thereof which fair outwardly so as to jacket part of the widening portion of the leaf spring. While not wishing to be bound by theory, it presently is understood that any longitudinal movement of the leaf spring relative to the clamp would produce a wedge effect, whereby a constantly widening portion of the leaf spring would be attempting to enter the more narrow central portion of the inner channel formed by the wedge insert. Obviously, any such longitudinal movement would be effectively prevented by such wedge effect in combination with the above discussed wedge effect provided by the interaction of the side wall convexity of the wedge insert and side wall concavity of the clamp base. According to one most preferred embodiment, the wedge insert is adhesively bonded to the leaf spring using any of numerous well known and commercially available adhesives. Such adhesive bonding has been found to prevent squirming of the resilient members and so reduces the mechanical working and consequent deterioration thereof. Also, the adhesive bond excludes dirt and the like from between the spring and the resilient members and so prevents abrasion damage to the spring.

Clamp plate 40 is adapted to be fixedly attached to the clamp base to clamp the leaf spring between them within the above described inner channel of the wedge insert. The clamp plate provides attachment holes 45A, 45B, 45C and 45D corresponding to holes 35A–35D of the clamp base. A pair of U-bolts (not shown) could extend through the above described bolt holes in the axle clamp assembly and be held by four fastening nuts (not shown). As will be further discussed below, however, U-bolts are not needed to clamp together the clamp plate and clamp base. They may, nevertheless, be useful in the assembly of the clamp. Typically, the lower portion of the clamp plate would form a so-called spring seat attached to an axle member or other like component by any suitable means such as by welding, bolts, etc.

Figure 2:
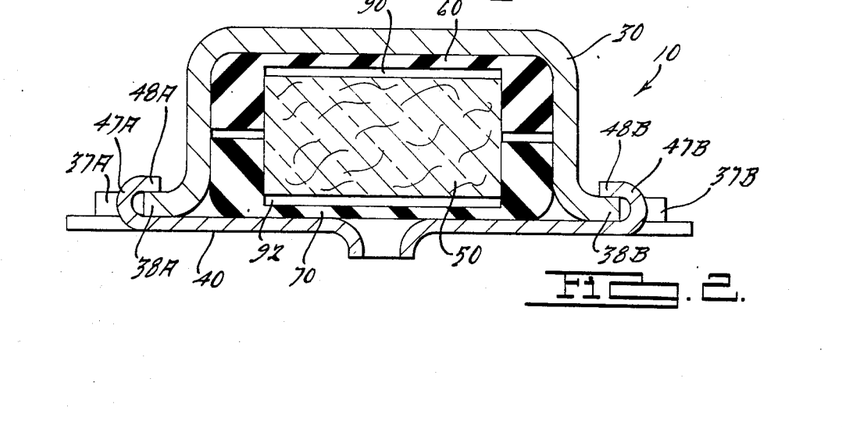
FIG. 2 is an elevation view, in cross-section, of the assembly of FIG. 2 (shown in non-exploded view) taken through line II—II.

The present invention is characterized by means to hold the clamp plate and clamp base pressed into contact with each other to produce a pre-selected pre-load on the resilient inserts between them. More specifically, in the preferred embodiment shown in the drawings, clamp base 30 has longitudinal flanges 36A, 36B extending outwardly from the side walls 32A, 32B, respectively. The clamp plate 40 is sufficiently wide that it provides portions 46A, 46B corresponding to flanges 36A, 36B, respectively. According to the invention, the leaf spring clamp is properly pre-loaded when the clamp base and clamp plate are brought together such that flanges 36A, 36B contact the corresponding portions 46A, 46B, respectively, of the clamp plate. To hold the clamp plate and clamp base together (i e., with the clamp base flanges and the corresponding portion of the clamp plate in contact or nearly so) means are provided comprising one or more slots in each flange of the clamp base and tabs in the corresponding portions of the clamp plate 40 located as to register with such slots. It will be obvious from this disclosure that, alternatively, the holding means may comprise slots in the clamp plate and corresponding tabs in the clamp base. To hold the two rigid members proximate one another the tabs are bent through the slots into a U-shape to overlap and so capture the other member. As seen in FIG. 1, tabs 47A and 47B on clamp plate 40 are positioned to register with slots 37A and 37B, respectively, of clamp base 30. The slots can easily be formed by known metal stamping techniques and the tabs can be formed similarly by cutting slots on either side of the portion to be used as a tab. In assembly, as aforesaid, the tabs are bent up into the corresponding slots to overlap and capture the other piece. Thus, as seen in FIG. 2, portion 48A of tab 47A overlaps portion 38A of clamp base 30. Similarly, portion 48B of tab 47B overlaps portion 38B of clamp base 30.

It will be appreciated that such means for holding the wedge insert under proper pre-load requires no calibration or measurements during the assembly or re-assembly of the clamp. The components simply are designed and sized according to well-known and understood principles to result in the desired pre-load when the tabs are bent into position to hold the clamp plate and clamp base in contact. Thus, consistent and reproducible pre-load is achieved in a simple and cost efficient manner.

According to the preferred embodiment of the invention shown in the drawings, the resilient inserts each comprises two resilient support pads, one at each of the two longitudinal ends of the inner channel. In resilient insert 70 (resilient insert 60 being identical in this preferred embodiment), support pads 77A and 77B are seen to be longitudinally spaced from each other and extend laterally between the wedge insert side walls. The support pads each provides an upper surface 78A, 78B, respectively, which is higher than the inner surface of the bottom wall 79 between the two support pads. The support pads are adapted to contact and support the leaf spring and, accordingly, in assembly with a leaf spring there is a cavity formed between the leaf spring and the bottom wall of the wedge insert between the support pads. Cavities 90 and 92 can be seen in FIG. 2 between the leaf spring and the upper resilient insert 60 and lower resilient insert 70, respectively. The two resilient inserts cooperate, therefore, to laterally encircle the leaf spring with resilient material. In view of the present disclosure, it will be understood that the support pads may be of semi-cylindrical configuration (rather than of rectilinear configuration as in FIGS. 1 and 2). It also will be understood that while the support pads are shown to be unitary with the resilient inserts, optionally they are separate components attached to the wedge insert or held in place by the compressive force of the clamp assembly. Additional suitable configurations will be apparent to the skilled of the art in view of the present disclosure. While the most advantageous dimensions for the upper and lower support pads will be determined in view of the intended application of each particular leaf spring clamp assembly, it generally is preferred that the surface thereof intended to contact the leaf spring each extend longitudinally approximately 10%–30% of the overall longitudinal dimension of the inner channel.

According to the present invention, the cavity formed above and below the leaf spring between the support pads within the leaf spring clamp allows the leaf spring to be vertically displaced within the clamp without encountering resistance from the resilient material of the wedge insert. As seen in FIGS. 1 and 2, downward bending of the ends of the leaf spring would displace the center of the leaf spring within the leaf spring clamp assembly upwardly into the cavity 90 formed between the leaf spring and the upper resilient insert 60. In like manner, upward bending of the ends of the leaf spring would cause displacement of the leaf spring within the clamp assembly into the cavity 92 formed between the leaf spring and the lower resilient insert 70. Thus, according to the present invention, a leaf spring can perform better and more nearly according to theoretical design specifications. Moreover, the forces between the clamp assembly and the leaf spring in resisting the bending forces applied to the leaf spring will be less concentrated and for this reason the leaf spring and clamp assembly will prove more durable and more resistant to failure.

The preferred configuration for the channel-widening concavity of the clamp base and the corresponding convexity of the wedge insert is that shown in FIGS. 1 and 2, wherein a single concavity is provided in each side wall of the clamp base, the concavities being preferably substantially symmetrical through a plane perpendicular to the bottom wall bisecting the channel longitudinally. Preferably each such concavity gradually and continuously widens as one moves longitudinally from the edge of the channel to the midpoint of the channel and thereafter gradually and continuously narrows to its original width at the opposite end. Also, typically, the channel will be of uniform lateral dimension (i.e. width) over the entire height of the side walls. Suitable alternative configurations will be apparent to the skilled of the art in view of the present disclosure. In general, a suitable configuration will depend, in part, upon the application to which the axle clamp assembly is to be put and upon the forces likely to be encountered by the leaf spring in normal use. In general, it will be within the ability of those of average skill in the art, in view of the present disclosure, to provide a leaf spring clamp according to the present invention, having a clamp base and wedge insert configuration suitable to substantially fix the leaf spring in position. One alternative configuration is that wherein the side walls of a clamp base provide two or more convexities each.

Figure 3:
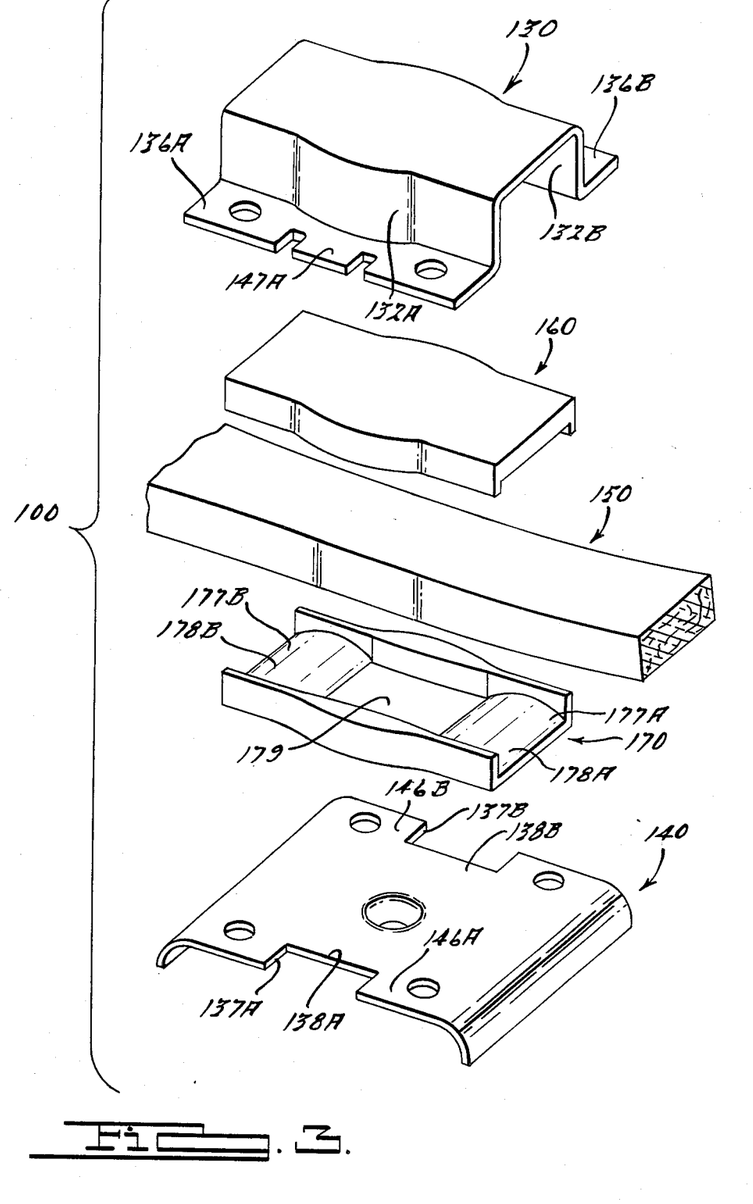
FIG. 3 is an exploded view, in perspective, of an alternate spring clamp embodiment.

Referring now to FIG. 3, axle clamp 100 (also referred to as a leaf spring clamp) is seen to comprise an upper rigid member, clamp base 130, and a lower rigid member, clamp plate 140. A leaf spring 150 is sandwiched between the upper and lower rigid members. A wedge insert comprising resilient inserts 160 and 170 is positioned mediate the leaf spring and the upper and lower rigid members to cushion the leaf spring from the rigid members during flexure of the leaf spring. Clamp plate 140 is adapted to be secured, such as by welding or other means, to a support member, such as an axle member in a motor vehicle suspension system. Each of the elements of the embodiment of FIG. 3 is as described for the embodiment of FIGS. 1 and 2, and operates in the manner described with respect thereto, except regarding the specific features now discussed. Clamp base 130 is seen to provide longitudinal flanges 136A and 136B extending outwardly from the side walls 132A and 132B, respectively. The clamp plate 140 is sufficiently wide that it provides portions 146A and 146B corresponding to flanges 136A and 136B, respectively. The leaf spring is properly pre-loaded when the clamp base and clamp plate are brought together such that flanges 136A and 136B contact corresponding portions 146A and 146B, respectively. To hold the clamp plate and clamp base together (i.e., with the clamp base flanges and the corresponding portion of the clamp plate in contact or nearly so) means are provided comprising a tab in each flange of the clamp base and a slot in the corresponding portion of the clamp plate so as to register with such slots. To hold the two rigid members proximate one another the tabs of the clamp base are bent through the slots into a U-shape to overlap and so capture the clamp plate. As seen in FIG. 3, tabs 147A and a similar positioned tab on the opposite side of clamp base 130 are positioned to register with slots 137A and 137B, respectively, of clamp plate 140. Thus, when in position, a portion of tab 147A will overlap portion 138A of clamp plate 140. Similarly, a portion of the tab on the opposite side of clamp base 130 will overlap portion 138B of clamp plate 140.

The resilient inserts 160 and 170 of the axle clamp 100 shown in FIG. 3 each comprises two resilient support pads, one at each of the two longitudinal ends of the inner channel. In resilient insert 170 (resilient insert 168, being identical to resilient insert 170 in the preferred embodiment of FIG. 3, will not be separately discussed) support pads 177A and 177B are seen to be longitudinally spaced from each other and the extend laterally between the wedge insert side walls. Each support pad has a semi-cylindrical upper surface, 178A and 178B respectively, which is higher than the inner surface of the bottom wall 179 between the two support pads. As described for the embodiment of FIGS. 1 and 2, in assembly with a leaf spring the support pads are adapted to contact and support the leaf spring and to form a cavity between the leaf spring and the bottom wall of the wedge insert between the support pads. The cavity formed above the leaf spring and the corresponding cavity formed below the leaf spring allow the leaf sprng to be vertically displaced within the axle clamp without encountering resistance from the resilient material of the wedge insert.

The leaf spring clamp of the present invention is suitable for use in conjunction with leaf springs fabricated of metal, but is particularly advantageous for use with composite material leaf springs. Such composite materials typically comprise filler materials such as, for example, aramid fibers, graphite fibers, metal fibers, glass roving or other filamentary solids and/or non-filamentary solids. Glass roving is often preferred in view of the physical properties of the resulting leaf spring and in view of the ease and cost efficiency of manufacturing the leaf springs by filament winding techniques. The composite material further comprises an organic solid matrix such as, for example, polyester, epoxy or other suitable thermoset plastic or a suitable thermoplastic. As an alternative to filament winding, the leaf spring can be manufactured by pultrusion methods or by compression molding or other methods known to the skilled of the art.

The leaf spring clamp of the invention can be employed together with a suitable leaf spring in any application for which metal or composite material leaf springs are suitable, and can be used according to methods well known to the skilled of the art. Thus, for example, the leaf spring clamp can be used in the suspension system of a motor vehicle in conjunction with additional suitable hardware. Preferably, the clamp base and clamp plate comprises suitable metal, for example steel, and the channel-widening concavities within the longitudinal channel of the clamp base can be provided during the manufacture of the clamp base. In addition to cast metal, stamped metal and the like, various other suitable materials and methods of forming the clamp plate and clamp base, and methods of forming the channel-widening concavities of the clamp base, will be apparent to the skilled of the art in view of the present disclosure. Thus, for example, in certain applications these components can be formed of suitable synthetic material, for example filament reinforced thermoset plastic and the like. Presently preferred is the use of HSLA 950 steel according to known metal stamping techniques.

As noted above, it presently is understood that the invention functions by providing a wedge effect between the wedge insert and the clamp base, whereby a frictional engagement of the inner surface of the wedge insert by the leaf spring is generated by translation of longitudinal forces from the leaf spring into lateral forces within the leaf spring clamp. Thus, as it is presently understood, increased loads on the leaf spring serve to increase the wedge effect and thus to increase the holding capability of the clamp. In view of this, it will be recognized that the invention provides a significant advance in the art, since the leaf spring is held in position without any positive attachment between the clamp and the leaf spring. No damage need be done to the leaf spring in the nature of bolt holes or the like nor any distortion or dislocation of the surface of the leaf spring to facilitate an attachment between the leaf spring and the clamp.

The thickness and configuration of the resilient inserts are not critical, except that together they should tightly jacket the leaf spring and the convexities of the side walls should be designed to engage and substantially fill the corresponding channel-widening concavities of the clamp base. The material of the inserts and the associated support pads generally should be of sufficient thickness and resilience to prevent undue stress concentration against the surface of the leaf spring, that is, to disperse pressures between the spring and the rigid components of the clamp. When used in the suspension system of a motor vehicle or other similar application, the inserts and support pads preferably are sufficiently thick to substantially dampen vibrations which otherwise would be transmitted from the axle through the leaf spring to the vehicle chassis. The resilient material also should be sufficiently tough to withstand the mechanical working of the clamp against the leaf spring and to protect the leaf spring against such mechanical working. Suitable materials for the inserts include, for example, natural rubber, suitable urethane rubbers, neoprenes, and the like. Preferably the resilient material is fabric reinforced, preferably cloth reinforced, since such reinforced materials have been found to provide excellent tear resistance, even following prolonged use. Most preferred is cloth reinforced urethane or neoprene. Natural rubber is less preferred when the clamp assembly is intended for use in the suspension system of a motor vehicle or other like environment in which it may be exposed to oil, gasoline and the like, in view of the poor resistance of natural rubber to these agents. Preferred for a typical motor vehicle use is a urethane rubber having hardness equal to about 30-40 Shore D, and sufficient toughness to withstand prolonged mechanical working. Other resilient materials suitable to provide the wedge function of the wedge insert and otherwise suitable for use in the preferred and alternative environments of the invention will be apparent to those skilled in the art in view of the present disclosure. In general, it will be within the ability of those skilled in the art, in view of the present disclosure, to determine a suitable configuration and thickness for the wedge insert for use in leaf spring clamp assemblies according to the above-described or alternative embodiments of the present invention.

The present invention provides an effective and inexpensive solution to the problems discussed above regarding the use of clamping means for composite material leaf springs. The leaf spring clamp of the present invention effectively prevents movement of the leaf spring not only laterally and vertically (vertically meaning in the plane of flexure of the spring and movement in this sense meaning movement of the entire spring), but also longitudinally (i.e., movement along the longitudinal axis of the leaf spring). Thus, the proper leverage point is maintained for the leaf spring in the suspension system and, consequently, the spring rate is not altered and the spring performs more consistently according to design. Also, according to the preferred embodiments disclosed above, wherein the resilient inserts provide support pads to form cavities above and below the spring within the clamp, upon flexure of the spring the compressive and tensile stresses are more properly distributed, thus avoiding material fatigue which otherwise could decrease the useful life of the spring. Specifically, in use with the present invention a leaf spring advantageously exhibits more nearly theoretical spring performance do to the cavities provided within the leaf spring clamp to accommodate curvature of the leaf spring during flexure. That is, the performance of the leaf spring is not inhibited by the need to compress resilient padding material within the clamp during flexure of the spring. Nevertheless, the leaf spring clamp of the present invention protects the leaf spring against contact with rigid clamp assembly components, which is especially significant in use with composite material leaf springs.

While the invention has been shown and described in its preferred embodiment, it will be clear to those skilled in the art that changes and modifications can be made thereto without departing from the scope of the invention as defined in the appended claims.

INDUSTRIAL APPLICATION

It will be obvious from the foregoing that this invention has industrial applicability to suspension systems employing a leaf spring, especially a motor vehicle suspension system, and provides a leaf spring clamp wherein a leaf spring is prevented from shifting its position relative to a support member in a direction along the longitudinal axis of the leaf spring. In addition, the clamp of the present invention has industrial applicability to suspension systems other than for motor vehicles, for example, for stationary machines and devices, and further has industrial applicability to uses such as will be apparent in view of the present disclosure to those skilled in various related arts.

We claim:

1. A leaf spring clamp assembly adaped to secure a synthetic material leaf spring in position in a suspension system, which leaf spring has upper, lower and side surfaces, said leaf spring clamp assembly comprising:

a rigid clamp base comprising a bottom wall and two substantially parallel side walls extending from said bottom wall to form therewith a channel, wherein the inner surface of at least one said side wall fairs from each longitudinal end into a channel-widening concavity;

a resilient wedge insert adapted to be positioned within said channel, comprising a wedge insert bottom wall adapted to be positioned substantially parallel to and adjacent to said clamp base bottom wall, two substantially parallel side walls, each having an inner surface and an outer surface, and a wedge insert top wall extending between said wedge insert side walls and forming therewith and with said bottom wall an inner channel adapted to have planar surface contact with said side surfaces of said leaf spring and to substantially encircle said leaf spring laterally, wherein the inner surface of each said wedge insert wall is adapted to contact said leaf spring along substantially the entire longitudinal dimension of said inner channel, and the outer surface of each said wedge insert side wall is adapted to be in substantial planar contact with the corresponding clamp base side wall to substantially fill said channel-widening concavity thereof, said wedge insert further comprising resilient support pads, one each of a first pair of said support pads being located at opposite longitudinal ends of said inner channel and having a contact surface adapted to contact and support one of said leaf spring upper surface and lower surface, and one each of a second pair of said support pads being located at opposite longitudinal ends of said inner channel and having contact surfaces adapted to contact and support the other of said leaf spring upper surface and lower surface, said contact surfaces of said first pair of support pads being offset from the inner surface of said wedge insert top wall and said contact surfaces of said second pair of support pads being offset from the inner surface of said wedge insert bottom wall; and a clamp plate adapted, together with said clamp base, to hold said leaf spring between them, wherein said clamp plate and said clamp base together comprise means for holding themselves in assembly in contact with each other to provide a preselected pre-load on said wedge insert sandwiched between them, said means comprising longitudinal flanges extending outwardly from said clamp base side walls and extending portions of said clamp plate corresponding to said flanges, each of said flanges providing one of a tab and a correspondingly positioned slot and each of said extending portions comprising the other of said tab and said correspondingly positioned slot, each said tab being adapted to be bent into said correspondingly positioned slot to overlap a periphery thereof.

2. The leaf spring clamp assembly of claim 1, wherein said wedge insert comprises two substantially identical resilient inserts, one said resilient insert comprising siad wedge insert bottom wall and the other said resilient insert comprising said wedge insert top wall, and each said resilient insert comprising approximately one half of each said side wall.

3. The leaf spring clamp assembly of claim 1, wherein said support pads are integral with said wedge insert.

4. The leaf spring clamp assembly of claim 1, wherein said support pads are substantially rectilinear, the contact surfaces thereof being substantially flat.

5. The leaf spring clamp assembly of claim 4, wherein the substantially flat upper surface of each said support pad extends longitudinally approximately 10%–30% of the longitudinal dimension of said inner channel.

6. The leaf spring clamp assembly of claim 1, wherein said support pads are substantially semi-cylindrical.

7. The leaf spring clamp assembly of claim 1, wherein said wedge insert comprises a material selected from the group consisting of natural and synthetic rubbers.

8. The leaf spring clamp assembly of claim 1, wherein said wedge insert comprises cloth fabric-reinforced synthetic rubber.

9. The leaf spring clamp assembly of claim 1, wherein said wedge insert comprises resilient material of hardness equal to about 30–40 Shore D.

10. The leaf spring clamp assembly of claim 9, wherein said resilient material comprises urethane rubber.

11. The leaf spring clamp assembly of claim 1, wherein said channel-widening concavity extends to a uniform lateral dimension over substantially the entire vertical dimension of said clamp base side wall at each longitudinal distance from the end of said channel.

12. The leaf spring clamp assembly of claim 1, wherein both said side walls of said clamp base provide a single said channel-widening concavity longitudinally centered about the longitudinal midpoint of said side walls.

13. The leaf spring clamp assembly of claim 1, wherein at least one of said side walls of said clamp base provides a series of said channel-widening concavities.

14. The leaf spring clamp assembly of claim 1, wherein said longitudinal flanges of said clamp base each provides a single said tab and said extending portions of said clamp plate each provides a single said correspondingly positioned slot, each said tab being adapted to be bent into a U-shape in the corresponding one of said correspondingly positioned slots to overlap a portion of said clamp plate peripheral to said slot.

15. A leaf spring clamp assembly comprising:
a leaf spring having top and bottom surfaces each extending laterally and longitudinally, and side surfaces extending vertically and longitudinally, said leaf spring having a longitudinally central section of substantially constant cross-sectional size and shape and a terminal section of increasing lateral dimension extending longitudinally from each end of said central section;

a rigid clamp base comprising a top wall and two substantially parallel side walls extending from said top wall to form therewith a longitudinal channel, wherein each said side wall fairs from each longitudinal end of said channel into a single channel-widening concavity longitudinally centered about the longitudinal midpoint of said side wall, each said channel-widening concavity extending to a substantially uniform lateral dimension over substantially the entire vertical dimension of said clamp base side wall at each longitudinal distance from each longitudinal end of said channel;

a resilient wedge insert nested within said longitudinal channel, comprising a first resilient insert having a top wall and two substantially parallel side walls extending downwardly therefrom and forming therewith an inner channel upper portion, said first resilient insert top wall having an inner surface and an outer surface, said outer surface being positioned substantially parallel to and adjacent said clamp base top wall, said wedge insert further comprising a second resilient insert having a bottom wall and two substantially parallel side walls extending upwardly therefrom and forming therewith an inner channel lower portion, said second resilient insert bottom wall having an inner surface and an outer surface, said inner channel lower portion together with said inner channel upper portion substantially encircling said leaf spring laterally, each said wedge insert side wall having planar surface contact with a corresponding one of said leaf spring side surfaces over substantially the entire surface area of said leaf spring side surfaces within said inner channel, and each said wedge insert side wall having planar surface contact with the corresponding one of said clamp base side walls to substantially fill the channel-widening concavities thereof, said wedge insert further comprising resilient rectilinear support pads extending laterally between said wedge insert side walls, one each of a first pair of said support pads being integral with said first resilient insert at opposite longitudinal ends of said inner channel and each having a contact surface offset downwardly from said inner surface of said wedge insert top wall and being in planar surface contact with and supporting the leaf spring upper surface, and one each of a second pair of said support pads being integral with said second resilient insert at opposite longitudinal ends of said inner channel and each having a contact surface offset upwardly from said inner surface of said wedge insert bottom wall and being in contact with and supporting the leaf spring lower surface, and a clamp plate substantially coplanar with and adjacent to said second resilient insert bottom wall, said clamp plate and said clamp base together comprising means for holding themselves in assembly in contact with each other to provide a preselected pre-load on said wedge insert sandwiched between them, said means comprising longitudinal flanges extending outwardly from said clamp base side walls and extending portions of said clamp plate corresponding to said flanges, each of said flanges providing one of a tab and a correspondingly positioned slot and each of said extending portions comprising the other of said tab and said correspondingly positioned slot, each said tab being bent into a U-shape in the corresponding one of said correspondingly positioned slots to overlap a periphery thereof.

* * * * *